Patented Oct. 10, 1933

1,929,561

UNITED STATES PATENT OFFICE 1,929,561

VULCANIZATION INHIBITING PROCESS AND COMPOUND

Harold A. Morton, Akron, Ohio

No Drawing. Application October 29, 1930
Serial No. 492,079

13 Claims. (Cl. 18—53)

This invention relates to the art of treating rubber or rubber-like compounds and particularly to a new and improved method of combining rubber with vulcanizing agents to produce improved results in operation.

It relates specifically to a new and useful method of overcoming or materially decreasing the tendency of rubber compounds to prevulcanize. This danger of prevulcanization is present to a great extent in modern rubber practice, due to the common use of so-called ultra accelerators, which, when incorporated into a batch of rubber containing vulcanizing ingredients, are likely to cause prevulcanization, or "scorching," on the mixing mill at a temperature below the melting point of sulphur.

Many such accelerators are in use at the present time but their utilization is restricted. Many precautions must be employed such as (a) increased time of mastication, (b) cooling the mill rolls with ice-water, (c) using a large quantity of oils or other softeners, (d) cutting the rubber stock from the mill rolls immediately after mixing, and submerging in or spraying with cold water, etc. Many batches are "scorched" even with such precautions and this results in considerable economic waste. If the rubber batch is successfully milled and calendered, precautions must be often taken so that the batch does not stand in stock-rooms for any appreciable length of time before use, otherwise incipient vulcanization is apt to occur, and render the rubber unfit for further use.

It is the purpose of the present invention to make use of certain substances which have heretofore not been used in the vulcanization of rubber, which cause the vulcanization characteristics of the rubber batch to be considerably altered, in that vulcanization at ordinary or slightly elevated temperatures is retarded, whereas vulcanization at elevated temperatures is not materially affected.

In its broad aspect my invention involves the discovery that materials containing aryl carboxyl groups, and by this I mean aryl carboxyl acids, their salts or materials which are characterized by an aryl carboxyl group, function in the above manner. These substances may be termed "inhibitors" of incipient vulcanization.

The preferred member of this group of inhibitors is benzoic acid ($C_6H_5COOH$) but many other acids of this type and their salts function in like manner among which may be mentioned: Methyl benzoic acids (toluic acids) $CH_3C_6H_4COOH$, ethyl benzoic acids $C_2H_5C_6H_4COOH$, dimethyl benzoic acids $(CH_3)_2C_6H_3COOH$, zinc methyl benzoate, ferric ethyl benzoate, zinc dimethyl benzoate, aluminum benzoate, ferric benzoate, ferrous benzoate, calcium methyl benzoate, zinc dimethyl benzoate, calcium benzoate, zinc benzoate.

Rubber compounds containing many different types of vulcanization accelerators may be employed in practicing this invention and among such compounds those containing the following accelerators may be mentioned.

(1) Dithio carbamates, salts and derivatives of dithio carbamates. Examples of such materials are:

(a) Dimethyl ammonium dimethyl dithio carbamate
(b) Diethyl ammonium diethyl dithio carbamate
(c) Zinc dimethyl dithio carbamate
(d) Dithio carbamates mixed with other materials, such as aldehyde amines, etc.

(2) Thiazoles, their derivatives and mixtures such as:

(a) Mercapto benzothiazole
(b) Methyl mercapto thiazole
(c) Mercapto benzothiazole mixed with other accelerators and activators, such as diphenyl guanidine.

(3) Aldehyde-amines, particularly when used in conjunction with other accelerators such as:

(a) Mercapto benzothiazole
(b) Dithio carbamates and salts.

(4) Disulphides and monosulphides such as:

(a) Tetramethyl thiuram disulphide
(b) Tetramethyl thiuram monosulphide.

The above list of materials serves only to indicate the scope of the invention and many modifications may be made.

One theory for the explanation of the function of the inhibitor is that it combines with the curing agents or accelerators in the rubber to form a loosely-linked compound which has a "critical temperature" above that of the accelerator and that when this compound is exposed to the proper degree of temperature, the union is broken and the original curing characteristics again exist.

I do not wish to be bound, however, by such theories, but desire to be protected by Letters Patent, for the use of the materials for the purpose described.

The materials may be added to the rubber mix during the mixing operation and it is preferable to add the inhibitor to the mix prior to the addition of the sulphur and accelerator. By this method of introduction the maximum safety is assured.

The inhibitors may, however, be added to the rubber mix at other points in the milling process and still obtain beneficial results.

As specific methods of carrying out the invention the following typical examples are given.

Example I

This example demonstrates the use of benzoic acid in a rubber stock accelerated with dimethyl ammonium dimethyl dithio carbamate. The method of determining "scorching" is that given by H. R. Theis—Journal Industrial and Engineering Chemistry 20, 1223 (1928).

Three different rubber stocks were mixed, the composition being as follows:

|  | Stock A | Stock B | Stock C |
|---|---|---|---|
| Rubber | 100 | 100 | 100 |
| Zinc oxide | 10 | 10 | 10 |
| Organic yellow | 10 | 10 | 10 |
| Sulphur | 2 | 2 | 2 |
| Accelerator | 0.3 | 0.3 | 0.3 |
| Benzoic acid |  | 0.5 | 1 |

The time tensil figures for the above stocks are as follows:

| Cure 239° F. | Stock A | | Stock B | | Stock C | |
|---|---|---|---|---|---|---|
| Minutes | Tensil strength (Lbs. per sq. in.) | Elong. Percent | Tensil strength (Lbs. per sq. in.) | Elong. Percent | Tensil strength (Lbs. per sq. in.) | Elong. Percent |
| 5 | 2910 | 990 | 1000 | 1000 | 25 | 900 |
| 10 | 3940 | 930 | 2410 | 920 | 650 | 880 |
| 20 | 4250 | 860 | 3770 | 880 | 3600 | 880 |
| 30 | 4385 | 820 | 4450 | 860 | 4210 | 880 |
| 50 | 4360 | 800 | 4240 | 830 | 4350 | 840 |

At the proper cure (30 minutes @ 239° F.) it is seen that the tensil strengths of all three stocks are about identical. The following table shows the relative scorching characteristics of the three stocks:

| Stock | Minutes required at 212° F. to cause incipient vulcanization |
|---|---|
| A | 8 |
| B | 23 |
| C | 48 |

It is thus seen that the addition of 0.5% and 1% of benzoic acid increased the time required for incipient vulcanization threefold and sixfold respectively over the time required in the absence of benzoic acid.

Example II

This example demonstrates the use of benzoic acid and salts in a rubber stock accelerated by mercapto benzothiazole. The following stocks were compounded and milled.

|  | A | B | C | D | E | F |
|---|---|---|---|---|---|---|
| Rubber | 100 | 100 | 100 | 100 | 100 | 100 |
| Zinc oxide | 10 | 10 | 10 | 10 | 10 | 10 |
| Organic yellow | 10 | 10 | 10 | 10 | 10 | 10 |
| Sulphur | 3 | 3 | 3 | 3 | 3 | 3 |
| Accelerator | 1 | 1 | 1 | 1 | 1 | 1 |
| Aluminum benzoate |  | 1 |  |  |  |  |
| Benzoic acid |  |  | 1 |  |  |  |
| Calcium benzoate |  |  |  | 1 |  |  |
| Iron benzoate |  |  |  |  | 1 |  |
| Zinc benzoate |  |  |  |  |  | 1 |

The time tensil figures for the above stocks are given in the following table. "T" represents "tensil strength in pounds per square inch" and "E" represents "elongation at break."

| Cure 274° F. | A | | B | | C | | D | | E | | F | |
|---|---|---|---|---|---|---|---|---|---|---|---|---|
| Minutes | T | E Per cent | T | E Per cent | T | E Per cent | T | E Per cent | T | E Per cent | T | E Per cent |
| 5 | 1180 | 860 | 2155 | 940 | No cure |  | 1190 | 970 | 310 |  | 250 |  |
| 10 | 3875 | 850 | 3330 | 840 | 3950 | 830 | 3420 | 850 | 3600 | 840 | 2880 | 830 |
| 15 | 3780 | 850 | 3760 | 840 | 4050 | 850 | 3610 | 860 | 3550 | 860 | 3040 | 850 |
| 20 | 3690 | 840 | 3620 | 840 | 3820 | 840 | 3890 | 870 | 3575 | 860 | 3475 | 860 |
| 25 | 3690 | 840 | 3890 | 830 | 3790 | 800 | 3840 | 860 | 3640 | 850 | 3860 | 840 |
| 30 | 3600 | 840 | 4000 | 840 | 3820 | 780 | 3530 | 840 | 3350 | 830 | 3730 | 820 |

The relative times required to give incipient vulcanization were then determined and are as follows:

| Stock | Minutes required at 212° F. to cause incipient vulcanization |
|---|---|
| A | 78 |
| B | 85 |
| C | 161 |
| D | 91 |
| E | 121 |
| F | 175 |

The foregoing example shows the value of these materials for retarding the prevulcanization of rubber stocks accelerated by mercapto benzothiazole.

Example III

This example demonstrates the use of benzoic acid for retarding the "setting-up" in storage of a rubber stock accelerated with zinc dimethyl dithio carbamate.

The following stocks were mixed, milled and sheeted out:

|  | A | B |
|---|---|---|
| Rubber | 100 | 100 |
| Zinc oxide | 10 | 10 |
| Sulphur | 2 | 2 |
| Zinc dimethyl dithio carbamate | 1 | 1 |
| Benzoic acid | 0 | 1 |

They were then allowed to stand in storage at ordinary temperature for a period of two months, whereupon they were examined and tested. Stock A had a tensil strength of 1000 pounds per square inch and was partially cured whereas stock B had a tensil strength of only 75 pounds per square inch and was completely unvulcanized.

The "scorching" time was also determined for the above two stocks by milling on rolls, the temperature of which were controlled. At a mill temperature of 210° F. stock A was completely "set-up" at the end of five minutes, whereas stock B required fifteen minutes to arrive at the same condition. The foregoing examples serve to indicate methods of practicing the invention but many modifications may be made by one skilled in the art.

It is often advantageous to use the inhibitor mixed with other materials to improve dispersion and ease of milling, thereby increasing the amount of retardation of vulcanization at low temperatures.

For example, benzoic acid may be dissolved in a suitable solvent and the solution added to the rubber batch. Or, the benzoic acid or salt may be mixed with a quantity of an oil capable of wetting the crystals and this mixture added to the rubber.

An alternative method which gives beneficial results in certain cases consists in mixing the benzoic acid or salt with a quantity of a finely divided pigment such as whiting, barytes, etc.

For certain cases it is advantageous to mix the inhibitor with the accelerator and add this mixture to the rubber batch. It is also advantageous under certain conditions to use a mixture of inhibitors, for example a mixture of benzoic acid and zinc benzoate.

The preferred method of practicing the invention is to employ from 0.25-2.0% of the inhibitor in the rubber batch but the quantity to be employed is dependent upon several considerations, such as (a) type of rubber stock; (b) amount of retardation desired; (c) accelerator employed and (d) inhibitor employed.

Up to a certain limit, the amount of retardation of vulcanization at low temperatures, is roughly proportional to the quantity of inhibitor employed. For this reason, the process is a very flexible one, allowing the regulation of curing characteristics to different degrees.

What I claim is:

1. A process of treating a rubber compound containing a vulcanizing agent, an ultra accelerator and zinc oxide, for retarding or inhibiting the prevulcanization thereof, and permitting vulcanization at elevated temperatures, consisting in incorporating in the compound a material having the constitution $$(C_6H_5COO)_x-R$$

where R is a member of the group consisting of hydrogen and metals and $x$ is a numeral equal to the valency of R.

2. The process defined in claim 1 in which the material incorporated in the compound has the constitution $$(C_6H_5COO)_x-R$$

where R is a member of the group consisting of $Al^{+++}$, $Ca^{++}$, $Fe^{++}$, $Fe^{+++}$, $H^+$, $Zn^{++}$ and $x$ is a numeral equal to the valency of R.

3. A process of treating a rubber compound containing a vulcanizing agent, an ultra accelerator and zinc oxide, for retarding or inhibiting the prevulcanization thereof, and permitting vulcanization at elevated temperatures, consisting in incorporating therein benzoic acid.

4. A rubber composition retarded as to vulcanization at prevulcanization temperatures and vulcanizable at elevated temperatures, including a vulcanizing agent, zinc oxide, an ultra accelerator, and a material having the constitution $$(C_6H_5COO)_x-R$$

where R is a member of the group consisting of of hydrogen and metals and $x$ is a numeral equal to the valency of R.

5. The composition of claim 4 in which the material is benzoic acid.

6. The composition of claim 4 in which the material has the constitution $$(C_6H_5COO)_x-R$$

where R is a member of the group consisting of $Al^{+++}$, $Ca^{++}$, $Fe^{++}$, $Fe^{+++}$, $H^+$, $Zn^{++}$ and $x$ is a numeral equal to the valency of R.

7. A rubber compound including a vulcanizing agent, zinc oxide, an ultra accelerator, and benzoic acid for inhibiting vulcanization at or below milling temperatures and permitting vulcanization at temperatures above milling temperature.

8. The process defined in claim 1 where the crystals of the material are completely wetted with an oil.

9. The process defined in claim 3 where the crystals of the benzoic acid are completely wetted with on oil.

10. The composition of claim 4 in which the crystals of the material are completely wetted with an oil.

11. The process defined in claim 2 where the crystals of the material are completely wetted with an oil.

12. A process of preparing a rubber compound including an ultra accelerator and vulcanizing agents designed to prevent vulcanization on the mixing mill, consisting of incorporating in the rubber prior to the addition of accelerators and vulcanizing agents, a material having the constitution $$(C_6H_5COO)_x-R$$

where R is a member of the group consisting of hydrogen and metals, and $x$ is a numeral equal to the valency of R.

13. The process defined in claim 12 in which the material incorporated in the rubber has the constitution $$(C_6H_5COO)_x-R$$

where R is a member of the group consisting of $Al^{+++}$, $Ca^{++}$, $Fe^{++}$, $Fe^{+++}$, $H^+$, $Zn^{++}$ and $x$ is a numeral equal to the valency of R.

HAROLD A. MORTON.